United States Patent

Mower

[11] Patent Number: 5,319,826
[45] Date of Patent: Jun. 14, 1994

[54] WINDSHIELD WIPER BLADE WITH ANGLED FRAME

[75] Inventor: Peter Mower, Twickenham, England

[73] Assignee: Trico Products Corporation, Buffalo, N.Y.

[21] Appl. No.: 766,904

[22] Filed: Sep. 26, 1991

Related U.S. Application Data

[63] Continuation of Ser. No. 464,475, Jan. 12, 1990, abandoned.

[51] Int. Cl.⁵ .............................. B60S 1/38; B60S 1/40
[52] U.S. Cl. ................................ 15/250.42; 15/250.32; 15/250.35
[58] Field of Search ........... 15/250.42, 250.36, 250.35, 15/250.31, 250.32

[56] References Cited

U.S. PATENT DOCUMENTS

| 3,603,168 | 9/1971 | Moorhead et al. | 15/250.42 |
| 4,553,283 | 11/1985 | Speth | 15/250.42 |
| 4,852,206 | 8/1989 | Fisher | 15/250.42 |

FOREIGN PATENT DOCUMENTS

| 1327782 | 4/1963 | France | 15/250.42 |
| 838316 | 6/1960 | United Kingdom | 15/250.36 |

Primary Examiner—Harvey C. Hornsby
Assistant Examiner—Gary R. Graham
Attorney, Agent, or Firm—Joseph G. Nauman

[57] ABSTRACT

A windscreen wiper blade (1) comprises a harness (3, 5, 7) carrying a blade rubber (23) for wiping contact with the windscreen and having means (17) for connection with a wiper arm (11) for driving the blade (1) across the screen, in which the longitudinal central plane ($\alpha$) through at least a part of the harness (3, 5, 7) lies at an angle ($\theta$) to the longitudinal central plane ($\beta$) of the blade rubber (23).

4 Claims, 5 Drawing Sheets

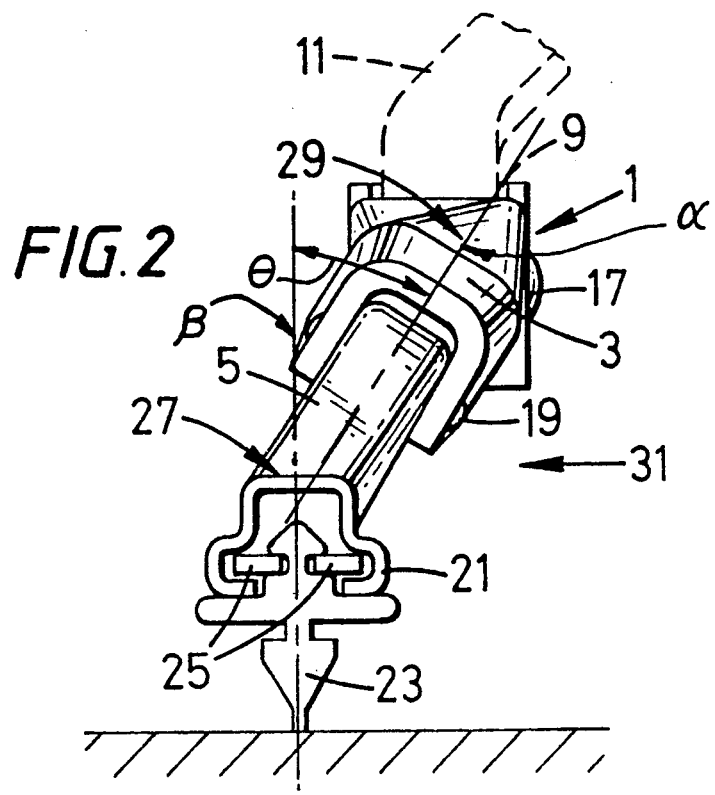
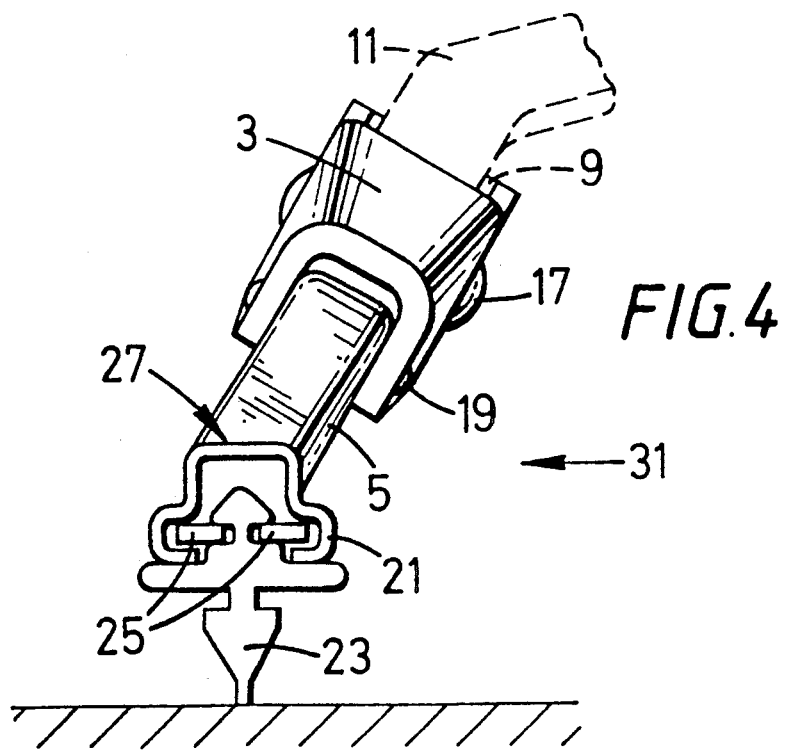

WINDSHIELD WIPER BLADE WITH ANGLED FRAME

RELATED APPLICATION

This application is a continuation of application Ser. No. 07/464,475 filed Jan. 12, 1990, now abandoned.

BACKGROUND OF THE INVENTION

This invention relates to a windscreen wiper blade.

With the advent of automobiles which can travel at ever higher speeds, problems have become apparent with traditional windscreen wiper systems due to the action of air flow on them generated by the high speeds now in use. The basic problem resides in the effect that the air flow has in lifting the windscreen wiper blades from the screen and thus preventing the driver from having a clear view.

A number of proposals have been made for dealing with this problem ranging from increasing the pressure at which the wiper blade is applied to the screen to the provision of vanes on various parts of the windscreen wiper to cause the airflow to act to press the windscreen wiper blade on to the screen, often with a pressure which varies in dependence on the air speed, or at least to prevent it from having a lifting action.

SUMMARY OF THE INVENTION

While a number of these methods have worked satisfactorily in practice, they have tended to be expensive with respect to material and labour used in their construction.

The present invention seeks to provide a windscreen wiper blade which is relatively inexpensive to manufacture and which overcomes some or all of the above problems.

According to the invention, there is provided a windscreen wiper blade comprising a harness carrying a blade rubber for wiping contact with the windscreen and having means for connection with a wiper arm for driving the blade across the screen, in which the longitudinal central plane through at least a part of the harness lies at an angle to the longitudinal central plane of the blade rubber.

Preferably, the longitudinal central plane of the harness is inclined in a direction towards the airflow direction.

Where the harness comprises a main yoke and at least two subsidiary yokes, the subsidiary yokes may be twisted adjacent to those ends to which the blade rubber is attached to provide the inclination. The centre part of the main yoke may be twisted in the opposite direction to the subsidiary yokes so that the windscreen wiper arm attachment lies at right angles to the central longitudinal plane of the blade rubber. Alternatively, twisting of the main yoke may be omitted, only the arm attachment lying at right angles to the central longitudinal plane of the blade rubber. In another form of the invention, the arm attachment may follow the line of the main yoke, for use with an arm provided with a compensatory twist.

BRIEF DESCRIPTION OF THE DRAWINGS

The invention will now be described in greater detail, by way of example, with reference to the drawings, in which:

FIG. 2 is an end view of the windscreen wiper blade as shown in FIG. 1;

FIG. 4 is an end view of the windscreen wiper blade as shown in FIG. 3;

DETAILED DESCRIPTION OF THE PREFERRED EMBODIMENT

Figure 1:
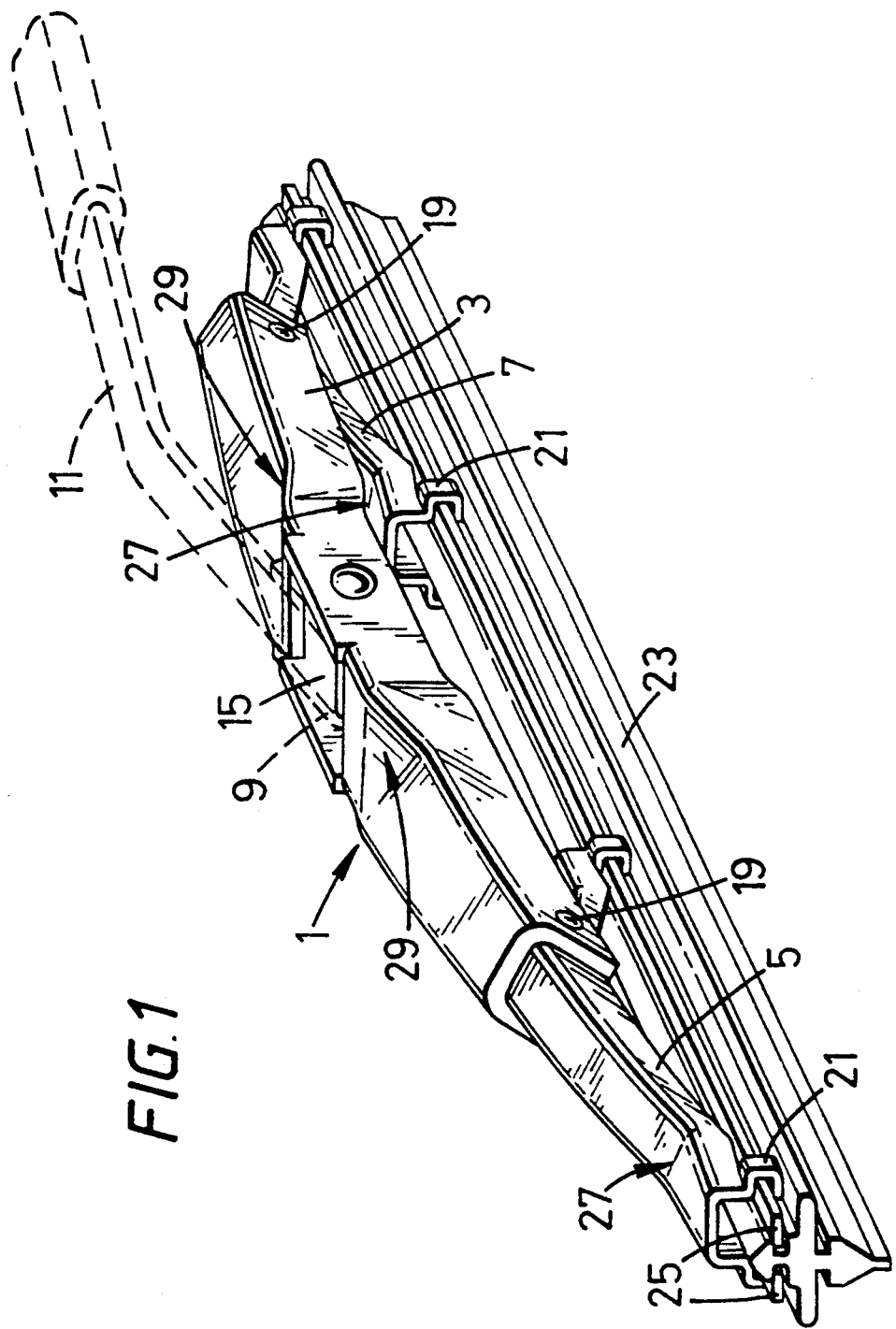
FIG. 1 is a perspective view of a windscreen wiper blade in accordance with a first embodiment of the invention.

Referring firstly to FIGS. 1 and 2, there is shown a windscreen wiper blade 1 comprising a main yoke 3 and two subsidiary yokes 5 and 7 depending therefrom. The main yoke 1 is provided with an attachment means 9 for the attachment of a windscreen wiper arm (shown in broken lines at 11). To this end, the main yoke 3 has a central aperture 15 in which is located a transverse pivot pin 17.

The subsidiary yokes 5 and 7 are pivoted at their mid points at 19 to the main yoke 3 and carry at their ends symmetrical claws 21 by means of which the blade rubber 23 is carried. As shown in the drawing, the blade rubber 23 is provided, in known manner, with a supporting vertebra in the form of a pair of rails 25 which are engaged by the claws 21 to hold the blade rubber assembly perpendicularly within claws 21 as shown in FIG. 2.

In order to mitigate the lifting effect of air flow on the blade, the centre part of the harness is inclined such that its central longitudinal plane $\alpha$ is inclined by an angle $\theta$ to the central longitudinal plane $\beta$ of the blade rubber 23 (see FIG. 2). To this end, the claw ends of the subsidiary yokes 5 and 7 are twisted as shown at 27, a matching but opposite twist being provided in the main yoke 3 on either side of the arm attachment 9 at 29. As can be seen more particularly in FIG. 2, this leaves the arm attachment portion of the main yoke 3 and the blade rubber 23 parallel but offset while the intermediate portion of the hardness is inclined to both. It is envisaged that, with the blade as orientated in FIG. 2, the airflow will be in the direction of the arrow 31.

Figure 3:
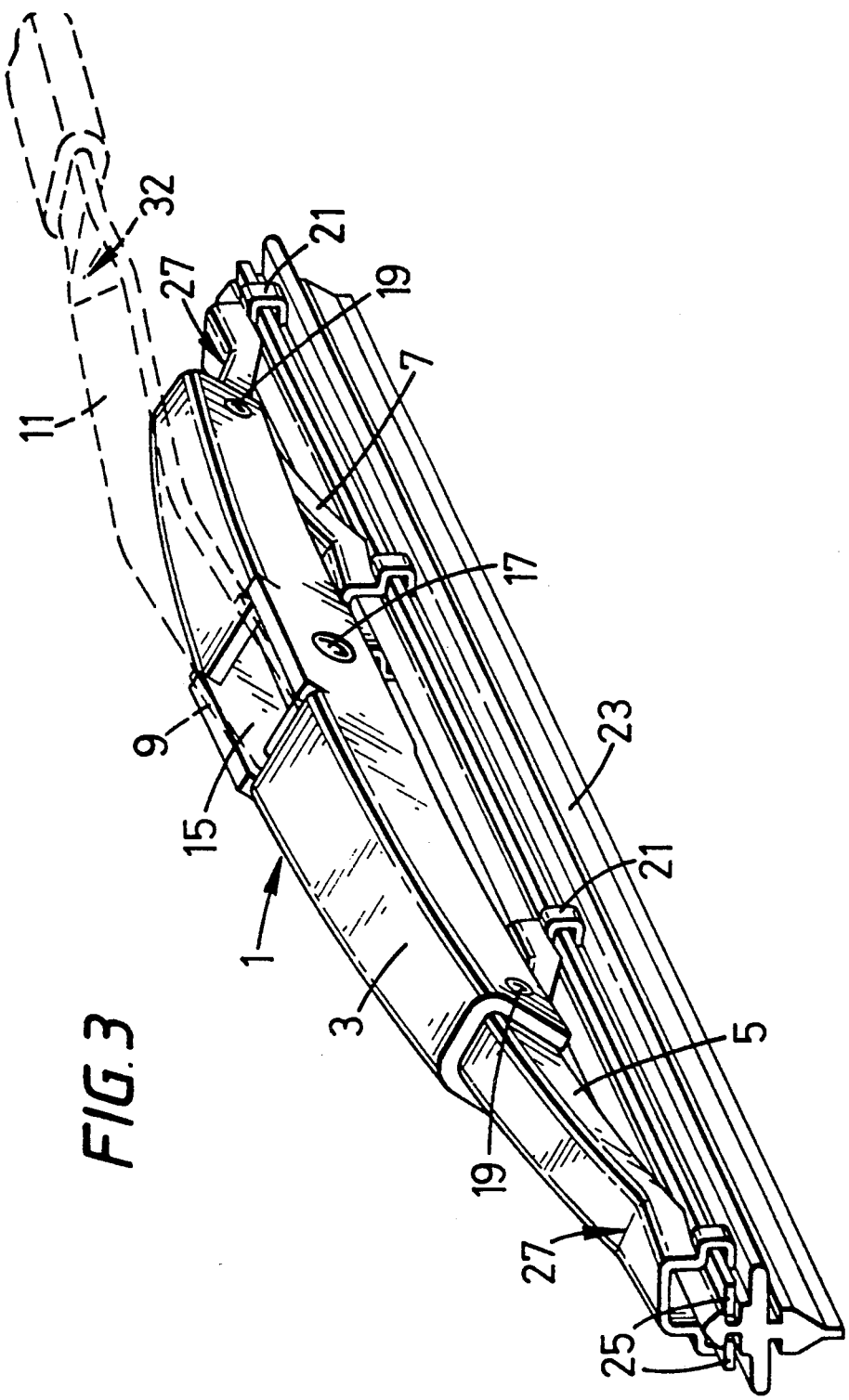
FIG. 3 is a view similar to FIG. 1 but showing a second embodiment of the invention.

FIGS. 3 and 4 show a second embodiment of the invention. This embodiment is basically the same as the embodiment of FIGS. 1 and 2, but in this case the twists 29 are missing, leaving the arm attachment 9 inclined also. In this case, the arm 11 would be provided with a twist, such as that shown at 32, to enable the main part of the blade 1 to be inclined while maintaining the wiper rubber 23 substantially at right angles to the windscreen.

Figure 5:
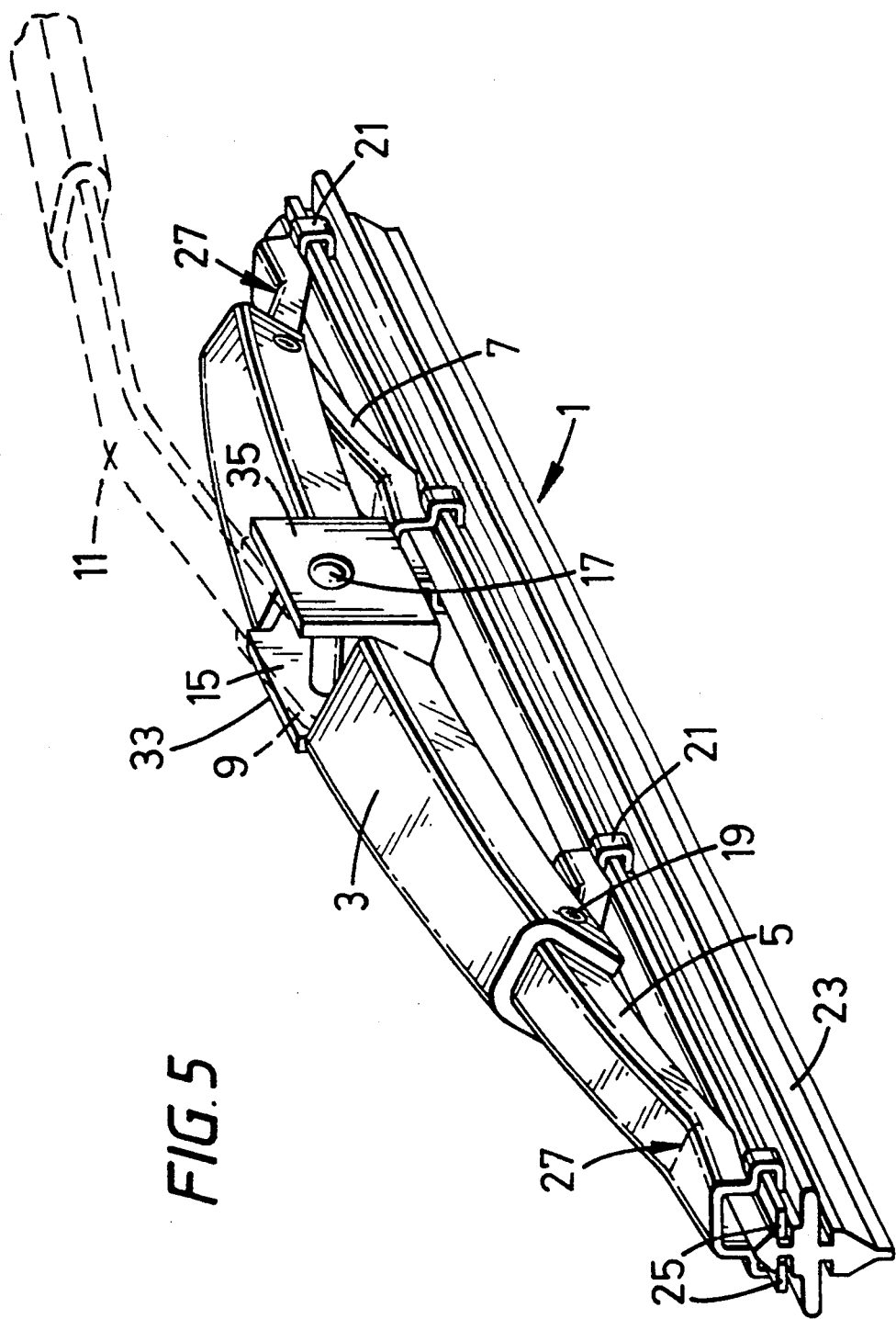
FIG. 5 is a view similar to FIG. 1 but showing a third embodiment of the invention.
Figure 6:
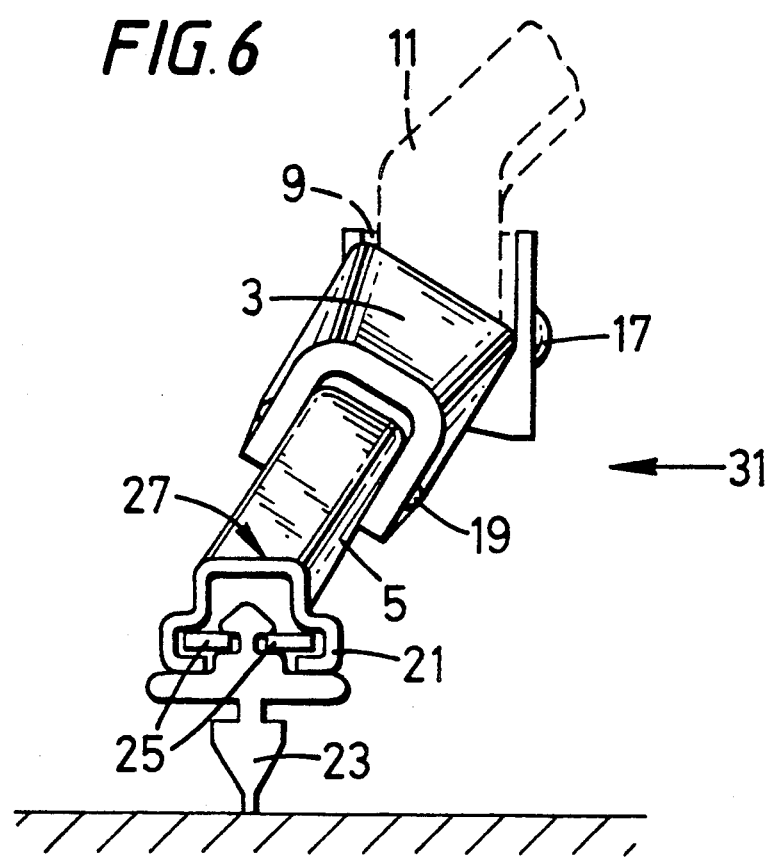
FIG. 6 is an end view of the windscreen wiper blade as shown in FIG. 5.

While this latter embodiment may be undersirable in certain instances, since it requires a specially formed arm, the advantage of only needing one twist can be maintained while enabling the use of a standard arm. Such an embodiment is shown in FIGS. 5 and 6. In this embodiment, the main yoke 3 remains inclined but the sides 33 and 35 of the aperture 15 of the arm attachment 9 are formed so as to be parallel with the central longitudinal plane of the blade rubber 23 and the side 35 is elongate so as to enable the pivot pin 17 to lie at right angles to the central longitudinal plane of the blade rubber 23.

Tests of these blades has demonstrated that they are less susceptible to wind-lift than similar non-inclined blades and will provide adequate wiping of the windscreen at higher speeds.

It will be understood that the exact construction of the wiper blade itself is not significant as far as the effectiveness of the invention is concerned although, of course, some constructions will operate better than others. Thus, for example, other known blade constructions having primary, secondary and tertiary yokes can be used, the blade end twists being only provided adjacent to the claws and, in particular, not at any end of a secondary yoke which supports a tertiary yoke. Different shaped wiper rubbers may be used as may different types of vertebra.

The exact construction of the arm attachment may be varied in any known way to provide known attachments to wiper arms. This includes those types in which no pivot pin is used and even extends to connections in which the arm and main yoke lie side by side.

It will of course be appreciated that in automobiles having dual wiper systems, it is not necessary, by reason of the type of sweep involved, for both blades to be of the type in accordance with the invention. Nevertheless, both blades may be of the same type if required for aesthetic reasons.

I claim:

1. A windscreen wiper blade including a blade rubber assembly including an elongated blade rubber (23) and rails (25), said blade rubber assembly having a central longitudinal plane $\beta$ adapted to be supported perpendicular to a windscreen, a hardness for supporting said blade rubber assembly comprising a main yoke (3) and at least two subsidiary yokes (5 and 7), pivotal attachments between said main yoke and said subsidiary yokes holding said yokes in a common central longitudinal plane ($\alpha$) of the harness, said subsidiary yokes each having symmetrical claws (21) at opposite ends thereof engaging said blade rubber assembly to hold the blade rubber perpendicularly within said claws, said main yoke also having a center part (9) including an arm attachment means (9) fitted with a pivot pin (17) extending along an axis which is at a predetermined angle with respect to said central longitudinal plane of the harness;

the improvement comprising each of said subsidiary yokes having twisted regions (27) of the same direction adjacent said claws and at an acute angle $\theta$ to locate said central longitudinal plane $\beta$ of said blade rubber assembly perpendicular to the windscreen while said central longitudinal plane $\alpha$ of the hardness is at a predetermined acute angle $\theta$ with respect to the windscreen whereby said blade rubber assembly is supported perpendicular to a windscreen and the remainder of said hardness is at an acute angle to the windscreen.

2. A windscreen wiper blade assembly as claimed in claim 1, wherein said center part (9) of said main yoke includes a twist (29) of opposite direction and equal angular extent to said twisted regions (27) in said subsidiary yokes, such that the axis of said pivot pin (17) lies at right angles to said central longitudinal plane $\beta$ of said blade rubber assembly.

3. A windscreen wiper blade assembly as claimed in claim 1, wherein said pivot pin (17) extends at right angles to said central longitudinal plane $\beta$ of said blade rubber assembly (23, 25).

4. A windscreen wiper blade as claimed in claim 1, wherein said pivot pin (17) is located perpendicular to said central longitudinal plane $\alpha$ of said main and subsidiary yokes, for use with an arm (11) having a part (32) twisted at said angle $\theta$.

* * * * *